(12) United States Patent
Morita (10) Patent No.: US 8,382,620 B2
(45) Date of Patent: Feb. 26, 2013

(54) V-BELT TYPE CONTINUOUSLY VARIABLE TRANSMISSION

(75) Inventor: Taisuke Morita, Itami (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 623 days.

(21) Appl. No.: 12/639,296

(22) Filed: Dec. 16, 2009

(65) Prior Publication Data
US 2010/0167853 A1 Jul. 1, 2010

(30) Foreign Application Priority Data

Dec. 25, 2008 (JP) ................................. P2008-330145

(51) Int. Cl.
*F16H 59/00* (2006.01)
(52) U.S. Cl. ........................................... 474/13; 474/144
(58) Field of Classification Search .................... 474/13, 474/144
See application file for complete search history.

(56) References Cited

U.S. PATENT DOCUMENTS

| 7,281,596 | B2 * | 10/2007 | Fukuda | 180/68.2 |
| 7,556,576 | B2 * | 7/2009 | Mochizuki et al. | 474/18 |
| 7,771,299 | B2 * | 8/2010 | Mochizuki et al. | 474/12 |

FOREIGN PATENT DOCUMENTS

| JP | 8-128517 | 5/1996 |
| JP | 63-62951 | 3/1998 |
| JP | 11-30314 | 2/1999 |
| JP | 2003-42270 | 2/2003 |
| JP | 2003-172437 | 6/2003 |
| JP | 2003-184972 | 7/2003 |
| JP | 2004-232805 | 8/2004 |
| JP | 2007-71255 | 3/2007 |
| JP | 2007-198547 | 8/2007 |

* cited by examiner

*Primary Examiner* — Sang Kim
(74) *Attorney, Agent, or Firm* — Wenderoth, Lind & Ponack, LLP (57) ABSTRACT

A V-belt type continuously variable transmission includes a drive pulley assembly provided on a drive shaft, a driven pulley assembly provided on a driven shaft, a V-belt looped over both the pulley assemblies, and a transmission case assembly housing both the pulley assemblies and the V-belt. One end of the drive shaft in the shaft direction is coupled to an output side rotation member of a centrifugal clutch, and the other end of the drive shaft is rotatably supported on a boss portion formed in the transmission case assembly.

5 Claims, 6 Drawing Sheets

Fig.6
Prior Art

V-BELT TYPE CONTINUOUSLY VARIABLE TRANSMISSION

BACKGROUND OF THE INVENTION

1. Field of the Invention

The present invention relates to a V-belt type continuously variable transmission and, particularly to a V-belt type continuously variable transmission attached to a crankshaft of an engine via a centrifugal clutch.

2. Description of the Related Art

As V-belt type continuously variable transmissions, Japanese Patent Laid Open Application No. 2003-184972 discloses a type having a clutch function capable of cutting mechanical power transmission between a V-belt and drive pulley assembly, and Japanese Patent Laid Open Application No. 2007-71255 discloses a type in which a V-belt and a drive pulley assembly are connected so that mechanical power can be transmitted therebetween and a centrifugal clutch or the like is separately arranged between a drive shaft and a crankshaft of an engine.

In the former type, since there is no need for separately providing the centrifugal clutch or the like, it is possible to simplify the entire configuration of the mechanical power transmission system and also make the entire mechanical power transmission system more compact. However, when the clutch is disengaged, a return spring is required in order to bias a movable sheave of the drive pulley assembly to a clutch disengaged position for example. Thus, the V-belt type continuously variable transmission is increased in size and complicated. Further, only with friction force between the V-belt and the movable sheave, capacity of the clutch is limited.

Figure 6:
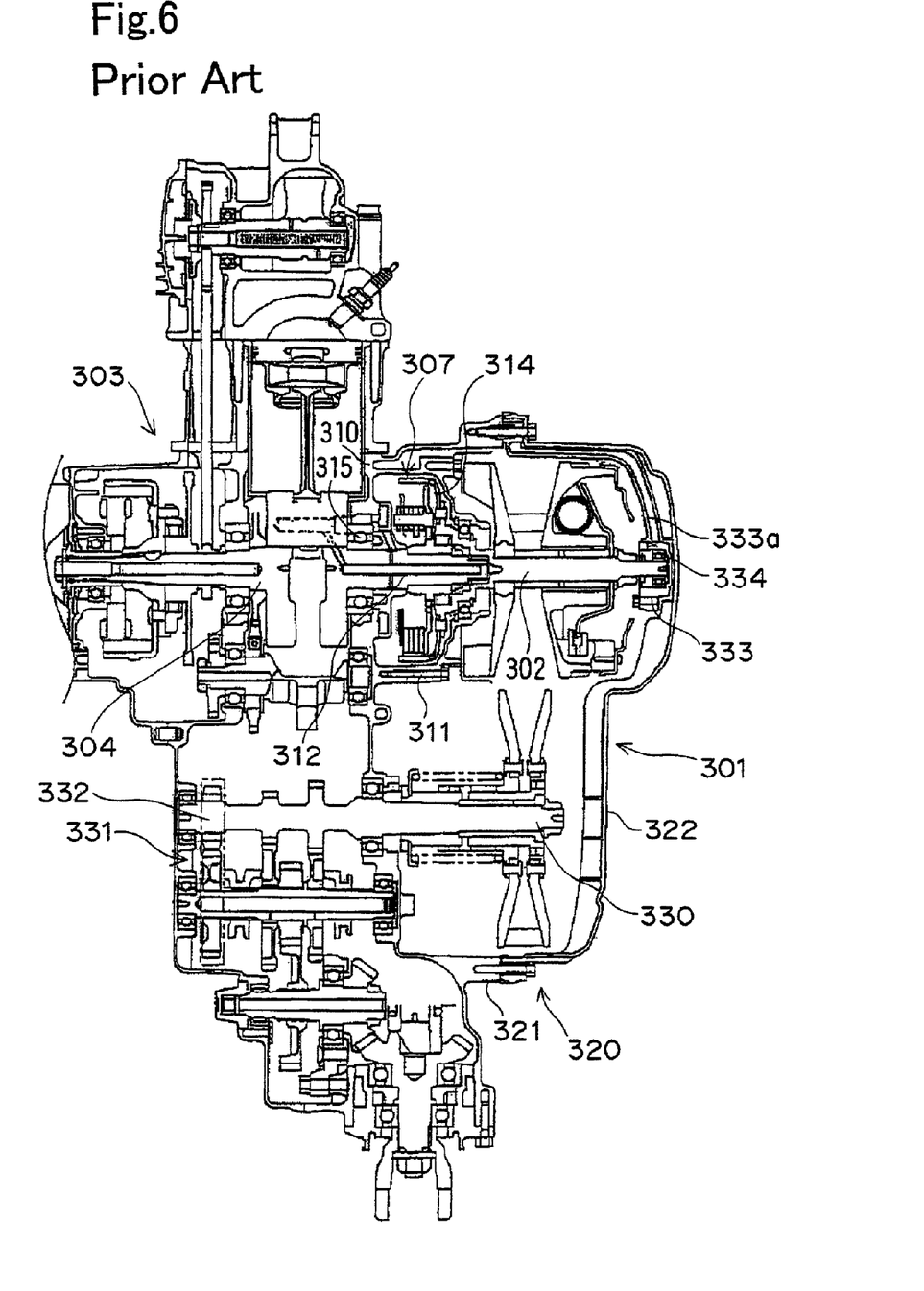
FIG. 6 is a vertical sectional view of a conventional example.

FIG. 6 shows one example of the latter type. Since a centrifugal clutch 307 is arranged between a drive shaft 302 of a V-belt type continuously variable transmission 301 and a crankshaft 304 of an engine 303, the entire mechanical power transmission system is increased in size. However, since the return spring described above is not required, it is possible to simplify the structure of the V-belt type continuously variable transmission 301, and also ensure large capacity of the clutch. It should be noted that hatching for showing a section is not applied in FIG. 6.

The conventional structure in FIG. 6 will be simply described. The centrifugal clutch 307 is housed in a clutch cover 311 attached to a crankcase 310 of the engine 303, a clutch input shaft 312 is formed integrally with the crankshaft 304, and a clutch housing 314 on the clutch output side is rotatably supported on an inner surface of the clutch cover 311 through a ball bearing 315.

A transmission case assembly 320 is formed by a transmission case body 321 molded integrally with the crankcase 310 and a transmission cover 322 attached to the transmission case body 321 by bolts. This transmission cover 322 is made of resin for reducing weight. The driven shaft 330 of the V-belt type continuously variable transmission 301 is molded integrally with an input shaft 332 of a gear type transmission 331 and cantilevered on the crankcase 310. One end of drive shaft 302 is integrally coupled to the clutch housing 314 on an output side of the centrifugal clutch 307, and the other end of the drive shaft 302 is rotatably supported on a boss portion 333 made of aluminum which is a separate member from the transmission cover 322 through a bearing 334 or the like. A stay portion 333a extending along the inner surface of the transmission cover 322 is integrally formed in the boss portion 333 made of aluminum. The stay portion 333a is fixed to a cover attachment surface of the transmission case body 321 together with the transmission cover 322. Since the other end of the drive shaft 302 is supported by the boss portion 333 made of aluminum and the stay portion 333a, rigidity relative to bending stress of the drive shaft 302 is enhanced.

However, as in the conventional structure shown in FIG. 6, when the boss portion 333 made of aluminum, which is the separate member from the transmission cover 322, is provided in order to support the other end of the drive shaft 302, the number of parts is increased and assembly work of the transmission case assembly 320 is complicated.

SUMMARY OF THE INVENTION

The present invention addresses the above described condition, and an object of the present invention is to support a drive shaft on both sides with high support rigidity in a V-belt type continuously variable transmission attached to a crankshaft via a centrifugal clutch without increasing the number of parts.

In order to achieve the above objects, the V-belt type continuously variable transmission according to the present invention is a V-belt type continuously variable transmission attached to a crankshaft of an engine via a centrifugal clutch, including a drive pulley assembly provided in a drive shaft, a driven pulley assembly provided in a driven shaft, a V-belt looped over both the pulley assemblies, and a transmission case assembly housing both the pulley assemblies and the V-belt, in which one end of the drive shaft in the shaft direction is coupled to an output side rotation member of the centrifugal clutch, and the other end of the drive shaft is rotatably supported on a boss portion formed in the transmission case assembly.

According to the above configuration, it is possible to support the drive shaft on the both sides without providing a separate shaft support member from the transmission case assembly for supporting the drive shaft of the V-belt type continuously variable transmission. Thus, it is possible to easily perform assembly work of the transmission case assembly and also reduce the number of parts of the V-belt type continuously variable transmission.

The present invention may include the following characteristics in addition to the above characteristic.

(1) The transmission case assembly includes a transmission case body fixed to or integrally formed in the crankcase of the engine, and a transmission cover made of aluminum or an aluminum alloy. The transmission cover is attached to the transmission case body, and the boss portion is formed in the transmission cover.

According to the above configuration, the other end of the drive shaft is supported by the boss portion formed in the transmission cover made of aluminum or an aluminum alloy. Thus, it is possible to enhance the support rigidity of the drive shaft and also improve the strength of the transmission cover. In addition, thermal radiation is also improved.

(2) The one end of the drive shaft is supported on a shaft support part formed in the transmission case body together with the output side rotation member of the centrifugal clutch.

According to the above configuration, it is also possible to simplify a support structure for the one end of the drive shaft.

(3) A reinforced-rib is formed in the transmission cover. The reinforced-rib may be formed so as to extend radially from the center of the boss portion.

According to the above configuration, it is possible to enhance the rigidity of the transmission cover without increasing the thickness of the transmission cover so as to improve support strength of the other end of the drive shaft. Particularly, when the reinforced-rib is formed radially from the boss portion, it is possible to concentrically enhance the rigidity of the boss portion and the vicinity thereof. It is also possible to reduce vibration of the transmission cover by the reinforced-rib so as to decrease the generation of noise.

(4) A seal is arranged on a mating surface between the transmission cover and the transmission case body.

According to the above configuration, with a dust prevention effect as a matter of course, it is possible to prevent transmittance of the vibration of the engine and the like to the transmission cover so as to prevent the generation of the noise.

BRIEF DESCRIPTION OF THE DRAWINGS

The above and other objects, features and advantages of the present invention will become more apparent from the following description taken in connection with the accompanying drawings, in which.

DETAILED DESCRIPTION OF THE PREFERRED EMBODIMENTS

FIGS. 1 to 4 show an engine provided with a V-belt type continuously variable transmission according to a first embodiment of the present invention and a four-wheeled vehicle. One embodiment of the present invention will be described based on the figures.

Figure 1:
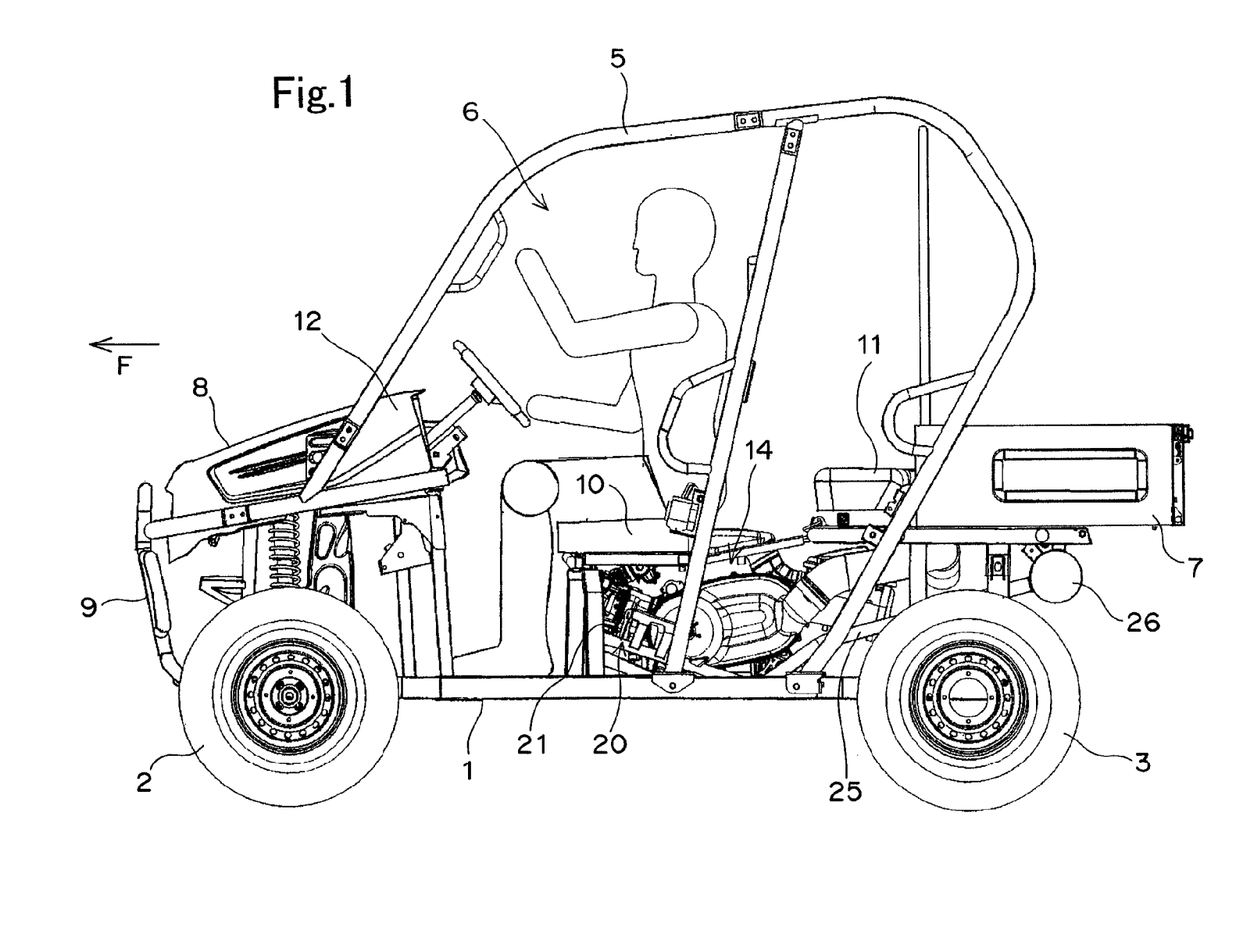
FIG. 1 is a partially cut left side view showing a four-wheeled vehicle in which an engine provided with a V-belt type continuously variable transmission according to one embodiment of the present invention is installed.

FIG. 1 is a left side view of the four-wheeled vehicle. A small-sized four-wheeled vehicle for irregular terrain (a so-called utility vehicle) is provided with a pair of left and right front wheels 2 in a front part of a vehicle frame 1, a pair of left and right rear wheels 3 in a rear part of the vehicle frame 1, a cabin 6 surrounded by a cabin frame 5 between the front wheels 2 and the rear wheels 3, a loading platform 7 on the rear side of the cabin 6, fenders (not shown) respectively on the upper side of the front wheels 2 and on the upper side of the rear wheels 3, and a bonnet 8, a bumper 9 and the like on the front side of the cabin 6.

A front seat 10 formed in a bench shape is installed in a front half part in the cabin 6, a rear seat 11 formed in a folding-type bench shape is installed in a rear half part in the cabin 6, and a dashboard (operation portion) 12 is provided in a front end of the cabin 6.

An engine room 14 is formed so as to extend from a lower space of the front seat 10 to a lower space of the rear seat 11 and also positioned in a center part of the vehicle in the width direction. An engine 20 is housed in this engine room 14 and supported on the vehicle frame 1. The engine 20 is a single-cylinder engine and has a single cylinder 21 which is inclined forward. Particularly, in order to reduce the total length of the engine 20, an inclination angle of the cylinder 21 is set to be substantially 60° or more relative to the vertical direction for example. An engine having a V-type cylinder or other type of cylinder can be provided as the engine 20.

An exhaust tube 25 connected to an exhaust port (not shown) of the engine 20 extends backward and is connected to an exhaust muffler 26 arranged on the lower side of the loading platform 7.

Figure 4:
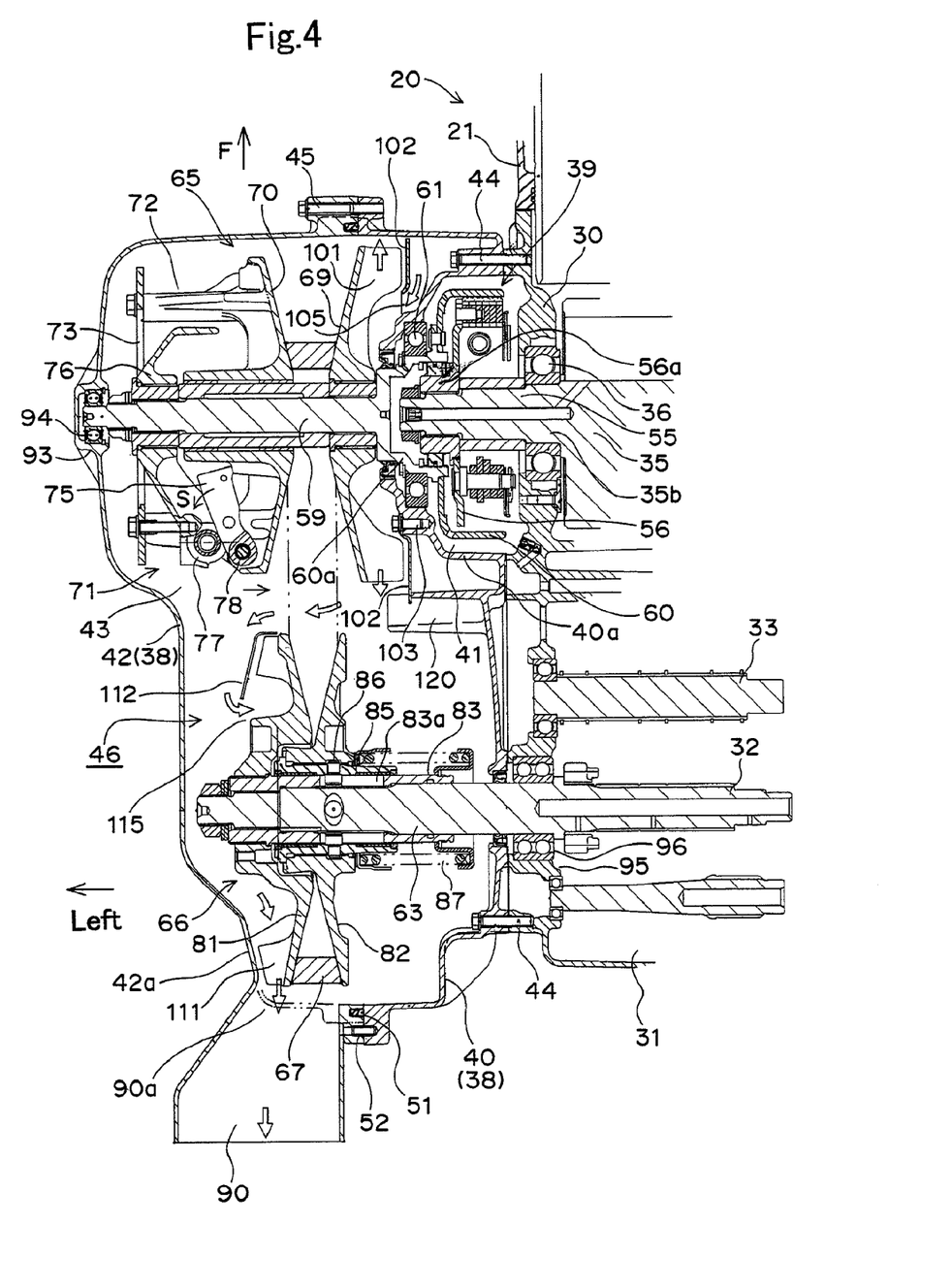
FIG. 4 is a sectional view taken along line IV-IV of FIG. 3.

In FIG. 4, a transmission case body 40 integrally having a clutch cover 40a is combined to a left wall of a crankcase 30 of the engine 20 by a plurality of bolts 44. A clutch chamber 41 for housing a centrifugal clutch 39 is formed (enclosed) by the clutch cover 40a and the left wall of the crankcase 30. The transmission case body 40 is made of aluminum or an aluminum alloy.

A transmission cover 42 is combined to a cover attachment surface of a left end of the transmission case body 40 by a plurality of bolts 45 through a trim seal 51 made of an elastic material. A transmission case assembly 38 is formed by the transmission case body 40 and the transmission cover 42. An interior of the transmission case assembly 38 serves as a continuously variable transmission chamber 43. The transmission cover 42 is made of aluminum or an aluminum alloy as well as the transmission case body 40. The transmission case body 40 and the transmission cover 42 are positioned relatively to each other by a knock pin 52. As described above, in a case where the transmission case body 40 and the transmission cover 42 are made of aluminum or an aluminum alloy, it is possible to obtain high strength and also have excellent thermal radiation.

A left journal portion 35b of a crankshaft 35 of the engine 20 is rotatably supported on a bearing hole in the left wall of the crankcase 30 through a ball bearing 36. A clutch shaft 55 on the clutch input side protruding in the clutch chamber 41 is integrally formed in the left journal portion 35b. A boss portion 56a of an inner member 56 of the centrifugal clutch 39 is spline-fitted to an outer peripheral surface of the clutch shaft 55 so as to be rotated integrally with the clutch shaft 55. A boss portion 60a of a clutch housing 60 is fitted to an outer peripheral surface of the boss portion 56a via a one-way clutch. The boss portion 60a of the clutch housing 60 is formed integrally with a drive shaft 59 of a V-belt type continuously variable transmission 46 and rotatably supported on an inner peripheral surface of the clutch cover 40a through a ball bearing 61.

A transmission chamber 31 for a gear type transmission (gears and the like are not shown) is provided in a rear part of the crankcase 30. The gear type transmission having a gearshift input shaft 32, a gearshift output shaft 33 and the like is arranged in the transmission chamber 31. The gearshift output shaft 33 is coupled to the rear wheels 3 (FIG. 1) via a bevel gear mechanism, a power transmission shaft and the like so as to transmit mechanical power. The gearshift input shaft 32 is rotatably supported on a left wall of the transmission chamber 31. A driven shaft 63 of the V-belt type continuously variable transmission 46 is formed integrally with this gearshift input shaft 32.

(V-Belt Type Continuously Variable Transmission 46)

The V-belt type continuously variable transmission 46 arranged in the continuously variable transmission chamber 43 is constituted by a drive pulley assembly 65 arranged in a front part of the continuously variable transmission chamber 43, a driven pulley assembly 66 arranged in a rear part of the continuously variable transmission chamber 43, a V-belt 67 looped over both pulley assemblies 65 and 66, and the transmission case assembly 38 housing both the pulley assemblies 65 and 66 and the V-belt 67.

(Structure of Drive Pulley Assembly 65)

The drive pulley assembly 65 is constituted by a fixed sheave 69 fixed to the drive shaft 59 so as not to move in the drive shaft direction, a movable sheave 70 fitted to the drive shaft 59 so as to move in the drive shaft direction, a sheave thrust force generating mechanism 71 of a flyweight type, and the like. One end of the drive shaft 59 in the shaft direction, that is, a right end thereof is formed integrally with the boss portion 60a of the housing 60 on the clutch output side of the centrifugal clutch 39 and supported on the inner peripheral surface of the clutch cover 40a through the ball bearing 61 as described above. The other end of the drive shaft 59, that is, a left end thereof is rotatably supported on an inner peripheral surface of a boss portion 93 formed in the transmission cover 42 through a ball bearing 94. In other words, the drive shaft 59 is supported on the both sides by the inner peripheral surface of the clutch cover 40a and the boss portion 93 of the transmission cover 42. The center of the boss portion 93 of the transmission cover 42 is matched with the center of a bearing hole part (a part for supporting the ball bearing 61) of the transmission case body 40 by the knock pin 52.

The fixed sheave 69 is screwed onto the right end of the drive shaft 59. The movable sheave 70 faces the fixed sheave 69 from the left side in the drive shaft direction and is fitted to the drive shaft 59 so as to move in the drive shaft direction. The V-belt 67 is sandwiched and retained from the left and right sides by a conical sandwiching surface formed by both of the sheaves 69 and 70.

A backing plate 73 formed in a square frame is combined to a back surface of the movable sheave 70 through a plurality of coupling arms 72 extending leftward. The backing plate 73 is moved in the drive shaft direction integrally with the movable sheave 70.

The sheave thrust force generating mechanism 71 is arranged between the back surface of the movable sheave 70 and the backing plate 73 and constituted by a plurality of (for example, four of) flyweights 75, a roller support member 76 and a plurality of pressure receiving rollers 77. The roller support member 76 is screwed onto the left end of the drive shaft 59 so as to be rotated integrally with the drive shaft 59. When the roller support member 76 is engaged with the coupling arms 72 in the circumferential direction, the movable sheave 70 is rotated integrally with the drive shaft 59 through the roller support member 76. A plurality of the flyweights 75 are arranged at an interval in the circumferential direction of the drive shaft 59. The flyweight 75 are rotatably supported on the back surface of the movable sheave 70 through a support shaft 78 and abutted with the pressure receiving rollers 77 from the right side.

(Structure of Driven Pulley Assembly 66)

The driven pulley assembly 66 is constituted by a fixed sheave 81 fixed to the driven shaft 63 so as not to move in the driven shaft direction, a movable sheave 82 fitted to the driven shaft 63 so as to move in the driven shaft direction, and the like. The driven shaft 63 is formed integrally with the gearshift input shaft 32 of the gear type transmission as described above, and cantilevered on a boss portion 95 in the left wall of the crankcase 30 through a ball bearing 96.

A cam tube 83 having a plurality of spiral cam grooves 83a is fixed to an outer peripheral surface of the driven shaft 63. An inner peripheral end of the fixed sheave 81 is screwed onto a left end of the cam tube 83. In other words, the fixed sheave 81 and the cam tube 83 are rotated integrally with the driven shaft 63. The movable sheave 82 is arranged so as to face the fixed sheave 81 from the right side in the driven shaft direction. A sleeve 85 for roller support is integrally combined to an inner peripheral end of the movable sheave 82. The sleeve 85 is fitted to an outer peripheral surface of the cam tube 83 so as to move in the driven shaft direction and biased to the side of the fixed sheave 81 (the left side) by a pressure regulating spring 87. A belt loop radius of the driven pulley assembly 66 is maintained to be the maximum (a low gear position) by the pressure regulating spring 87.

A roller 86 movably engaged with the spiral cam grooves 83a is supported on the sleeve 85. When tensile force of the V-belt 67 is increased in accordance with an increase in a load on the wheel side during vehicle running, the movable sheave 82 is rotated in the rotational direction relatively to the fixed sheave 81. By a cam action of the cam grooves 83a of the cam tube 83 and the roller 86, the sleeve 85 and the movable sheave 82 are moved rightward in a spiral shape to the cam tube 83 so as to reduce the belt loop radius of the driven pulley assembly 66.

(Cooling Device of V-Belt Type Continuously Variable Transmission 46)

Figure 2:
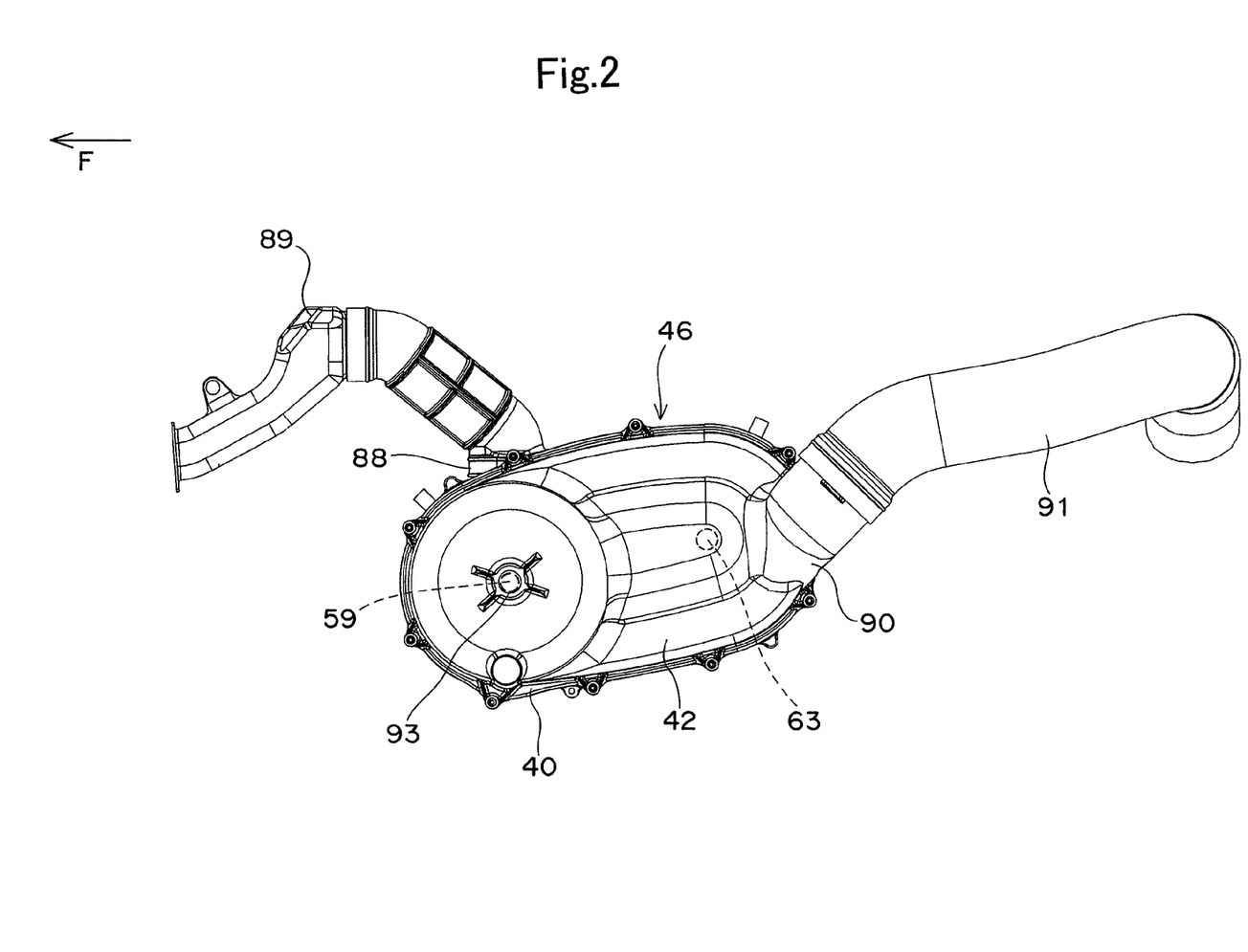
FIG. 2 is a left side view of the V-belt type continuously variable transmission of FIG. 1 to which a transmission cover, an air introduction duct and an air exhaust duct are attached.
Figure 3:
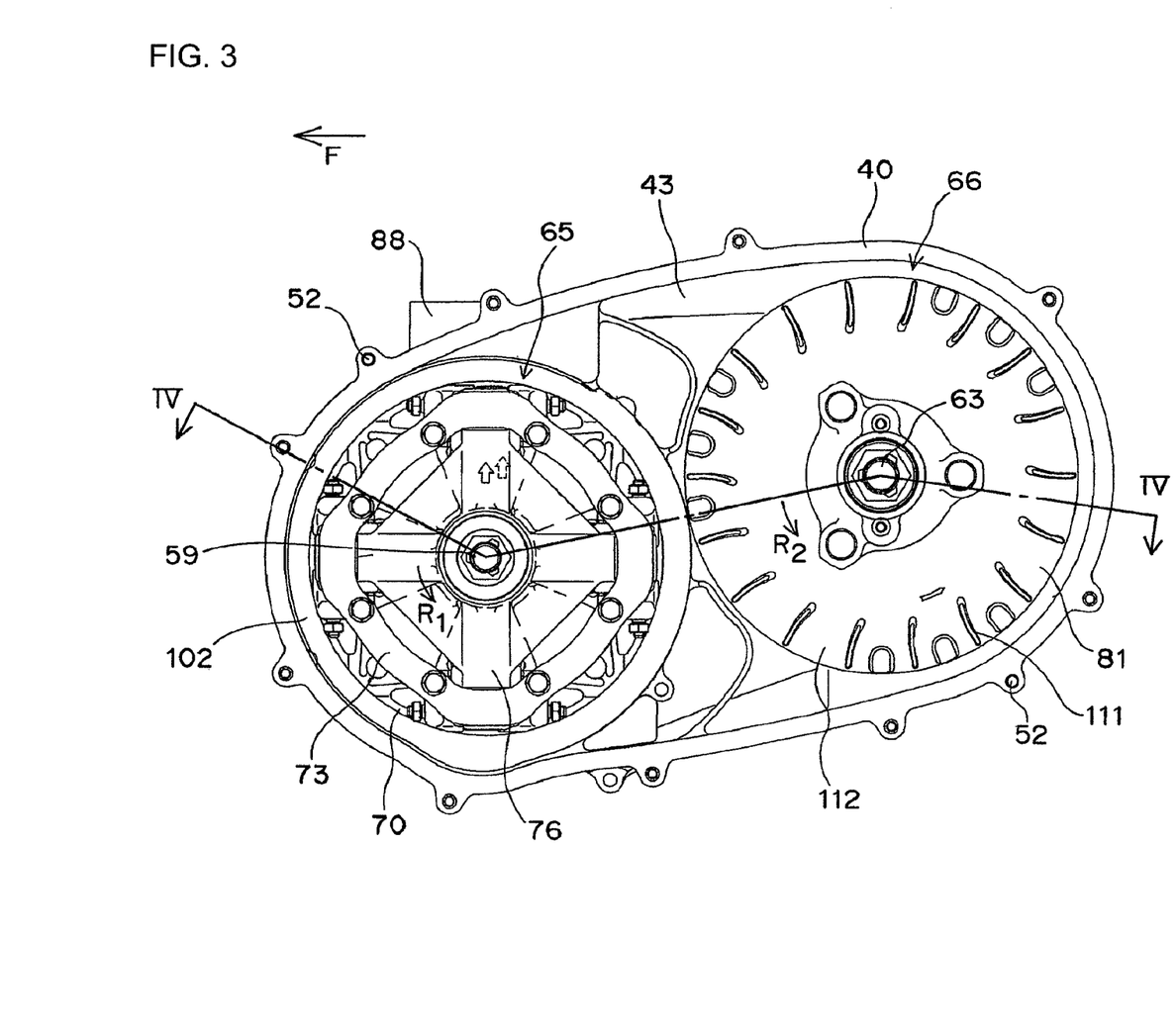
FIG. 3 is a left side view showing the V-belt type continuously variable transmission of FIG. 1 from which the transmission cover is removed.

In FIG. 3, an air intake port 88 is opened in an upper wall of the transmission case body 40 at a position substantially right above the drive shaft 59. As shown in FIG. 2, an air intake duct 89 is connected to the air intake port 88. This air intake duct 89 is formed into a substantially L shape in a side view, and extends forward and communicates with an interior of the bonnet 8 of FIG. 1 for example.

In FIG. 2, an air exhaust port 90 is opened in a rear end of the transmission cover 42 at a position in the vicinity of a rear part of the driven shaft 63. An air exhaust duct 91 is connected to this air exhaust port 90.

In FIG. 4, a plurality of first cooling fins 101 are formed on a back surface (a right side surface) of the fixed sheave 69 at an equal interval in the circumferential direction. A first casing 102 for the first cooling fins is arranged at a position which is away from right edges of the first cooling fins 101 by a predetermined gap on the right side in the drive shaft direction. The first casing 102 is fixed to a part of the clutch cover 40a of the transmission case body 40 by a bolt 103. An air inlet 105 is provided in a center part of the first casing 102 so as to surround the clutch cover 40a.

In FIGS. 3 and 4, a plurality of second cooling fins 111 are also formed in the driven pulley assembly 66 at an equal interval in the circumferential direction. A substantially semi-arc second casing 112 is arranged in a front half part of the fixed sheave 81 at a position which is away from left edges of the second cooling fins 111 by a predetermined gap on the left side in the driven shaft direction.

In FIG. 4, in a rear half part of the fixed sheave 81 of the driven pulley assembly 66, a part 42a of the continuously variable transmission cover 42 faces the left edges of the second cooling fins 111 from the left side while leaving a predetermined gap in-between. Thereby, the part 42a of the continuously variable transmission cover 42 plays a role of a second casing.

An air guiding portion 120 protruding leftward is integrally formed at a position between both the pulley assemblies 65 and 66 in the front and rear direction of the transmission case body 40. This air guiding portion 120 guides the air fed from the first cooling fins (fixed sheave 69) of the drive pulley assembly 65 to an air inlet 115 in a center part of the driven pulley assembly 66 on the rear left side.

(Operation)

In FIG. 4, at the time of engine stop or idling, since the centrifugal clutch 39 is disengaged; the drive shaft 59 of the V-belt type continuously variable transmission 46 is not rotated. At this time, the movable sheave 70 of the drive pulley assembly 65 is moved to a maximum opening position integrally with the backing plate 73. Meanwhile, the movable sheave 82 of the driven pulley assembly 66 is moved to the closest side to the fixed sheave 81 (the leftmost position side) by the pressure regulating spring 87. In other words, a reduction ratio of the V-belt type continuously variable transmission 46 is in a low gear state (a maximum deceleration state).

When the engine rotation number is increased from idling, the centrifugal clutch 39 is connected so as to start rotating the drive shaft 59. Then, firstly in the low gear state, the mechanical power is transmitted from the drive pulley assembly 65 to the driven pulley assembly 66 through the V-belt 67.

When the engine rotation number is further increased, the flyweights 75 of the sheave thrust force generating mechanism 71 are rotated in the arrow S direction by centrifugal force so as to push the pressure receiving rollers 77. The pressure receiving rollers 77 themselves are not moved in the drive shaft direction. Thus, by reactive force of these pressure receiving rollers 77, the movable sheave 70 and the backing plate 73 are integrally moved rightward in the drive shaft direction so as to reduce a gap between the movable sheave 70 and the fixed sheave 69. Thereby, the V-belt 67 is moved outward in the radial direction so as to increase a loop radius.

When the loop radius of the V-belt 67 of the drive pulley assembly 65 is increased, the tensile force of the V-belt 67 is increased in the driven pulley assembly 66. Thus, bonding force between left and right side surfaces of the V-belt 67 and both the sheaves 81 and 82 is increased. Thereby, the movable sheave 82 is moved rightward in a spiral shape relative to the fixed sheave 81 against the pressure regulating spring 87 so as to increase a gap between the movable sheave 82 and the fixed sheave 81 and hence reduce the loop radius.

As described above, the increase in the loop radius of the drive pulley assembly 65 and the reduction in the loop radius of the driven pulley assembly 66 decrease the reduction ratio. In other words, the low gear state is shifted to a high gear state.

According to the above embodiment, the other end (the left end) of the drive shaft 59 is supported by the boss portion 93 formed in the transmission cover 42. Thus, there is no need for providing a separate shaft support member from the transmission cover 42 for supporting the drive shaft 59. It is possible to reduce the number of parts of the V-belt type continuously variable transmission 46, simplify the structure and easily perform assembly work. Moreover, the transmission cover 42 is made of aluminum or an aluminum alloy as well as the transmission case body 40. Thus, it is possible to further enhance support rigidity of the drive shaft 59 and obtain excellent thermal radiation.

The one end of the drive shaft 59 is supported on the clutch cover 40*a* as well as the housing 60 on the clutch output side of the centrifugal clutch 39. Thereby, it is also possible to reduce the number of parts.

The trim seal 51 made of an elastic material is arranged on a mating surface between the transmission case body 40 and the transmission cover 42. Thus, it is possible to prevent transmittance of vibration of the engine and the like to the transmission cover 42 so as to prevent generation of noise.

Figure 5:
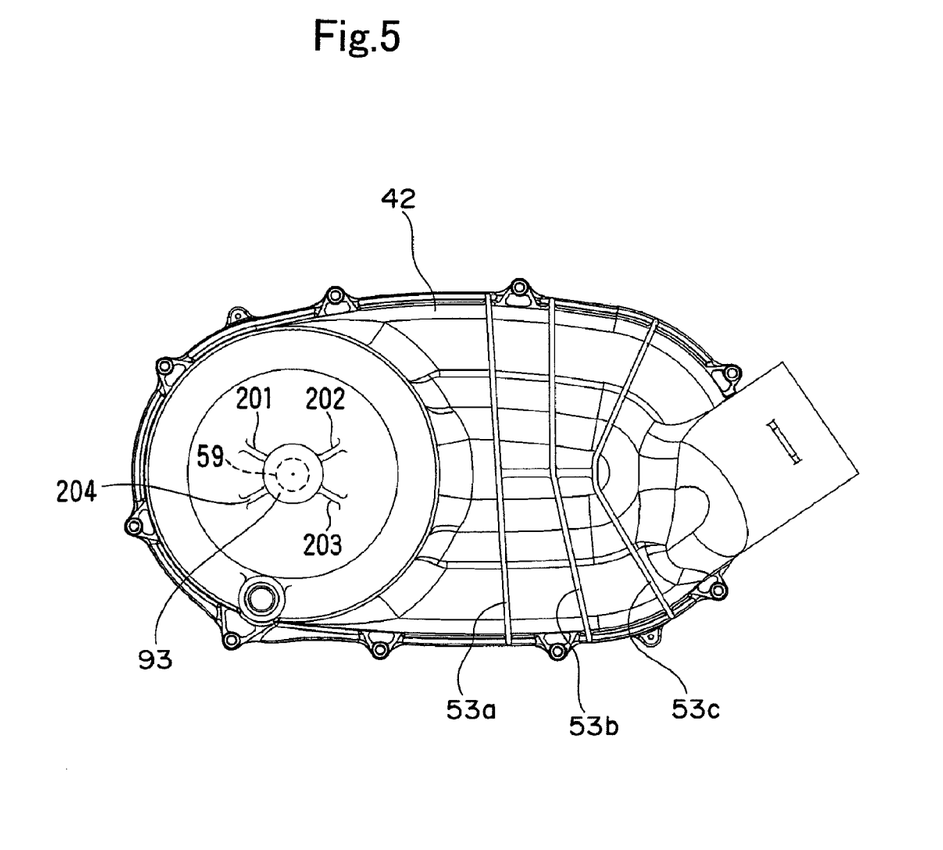
FIG. 5 is a side view of a transmission cover according to a second embodiment of the present invention.

(1) FIG. 5 is a left side view of a transmission cover 42 of a second embodiment. This transmission cover 42 is made of aluminum or an aluminum alloy as well as in the first embodiment. In the transmission cover 42, the boss portion 93 for drive shaft support is integrally provided and a plurality of, for example three reinforcing ribs 53*a*, 53*b* and 53*c* are formed on a left side surface (an outer surface) in order to enhance rigidity.

These reinforcing ribs 53*a*, 53*b* and 53*c* are arranged in a rear half part of the transmission cover 42 while leaving gaps in-between in the front and rear direction. The reinforcing ribs 53*a*, 53*b* and 53*c* extend in the substantially up and down direction from an upper end to a lower end of the transmission cover 42. The reinforcing rib 53*a* on the front side is formed in a substantially straight line in a side view, the intermediate reinforcing rib 53*b* is slightly bent in a side view, and the reinforcing rib 53*c* on the rear side is bent into an L shape in a side view.

When the reinforcing ribs 53*a*, 53*b* and 53*c* are formed in the transmission cover 42 as above, it is possible to enhance the rigidity without increasing the thickness of the transmission cover 42 and also suppress the vibration of the engine or the vibration of the V-belt type continuously variable transmission.

Further, in the embodiment of FIG. 5, a plurality of reinforcing ribs 201, 202, 203 and 204 extending radially from the center of the boss portion 93 are formed on a left side surface (an outer surface) and a right side surface (an inner surface) of a front part of the transmission cover 42. Since the reinforcing ribs 201, 202, 203 and 204 are radially formed in the circumference of the boss portion 93 as above, with improvement of the strength of the transmission cover 42 as a matter of course, it is possible to concentrically enhance the support rigidity of the boss portion 93 for supporting the other end of the drive shaft 59.

(2) In the above embodiment, the transmission case body 40 is formed as a separate body from the crankcase 30 and fixed to the crankcase 30 by the bolts 44. However, the transmission case body 40 may be molded integrally with the crankcase 30. In this case, the crankcase 30 preferably has a left-right divided structure.

(3) The present invention is not limited to the engine to be installed in the four-wheeled vehicle for irregular terrain as in FIG. 1 but may be applied to an engine for a passenger vehicle to be installed in various vehicles such as a two-wheeled motor vehicle and a three-wheeled vehicle or small watercraft and the like as a matter of course, and also applied to things other than the engine for the passenger vehicle. Further, the present invention may be applied to an engine having a plurality of cylinders.

(4) The present invention is not limited to the structure of the above embodiment, but may include various modifications obtained within a range not departing from a scope of claims.

What is claimed is:

1. A V-belt type continuously variable transmission attached to a crankshaft of an engine via a centrifugal clutch, comprising:
    a drive pulley assembly provided on a drive shaft;
    a driven pulley assembly provided on a driven shaft;
    a V-belt looped over both the drive pulley assembly and the driven pulley assembly; and
    a transmission case assembly housing the drive pulley assembly, the driven pulley assembly, and the V-belt, wherein:
    one end of the drive shaft in the shaft direction is coupled to an output side clutch housing of the centrifugal clutch;
    the other end of the drive shaft is rotatably supported on a boss portion formed in the transmission case assembly;
    the transmission case assembly includes a transmission case body fixed to or integrally formed in the crankcase of the engine, and a transmission cover made of aluminum or an aluminum alloy;
    the transmission cover is attached to the transmission case body;
    the boss portion is formed in the transmission cover;
    a plurality of reinforcing-ribs are formed in the transmission cover so as to extend radially from a center of the boss portion; and a plurality of rear reinforcing-ribs are formed in a rear half part of the transmission cover so as to extend in a substantially up and down direction.

2. The V-belt type continuously variable transmission according to claim 1, wherein:

the rear reinforcing-ribs are arranged at intervals from each other in the front and rear direction;

one of the rear reinforcing-ribs arranged at a rear-most side of the transmission cover is formed in an L shape; and another one of the reinforcing-ribs arranged at a front-most side of the transmission cover is formed in a linear shape.

3. The V-belt type continuously variable transmission according to claim 2, further comprising a centrifugal clutch housing and a centrifugal clutch cover, wherein the one end of the drive shaft is formed integrally with a boss portion of the centrifugal clutch housing, and the boss portion of the centrifugal clutch housing is rotatably supported on an inner peripheral surface of a centrifugal clutch cover.

4. The V-belt type continuously variable transmission according to claim 3, wherein the centrifugal clutch cover is integrally formed with the transmission case body.

5. The V-belt type continuously variable transmission according to claim 2, wherein a seal is arranged on a mating surface between the transmission cover and the transmission case body.

* * * * *